UNITED STATES PATENT OFFICE.

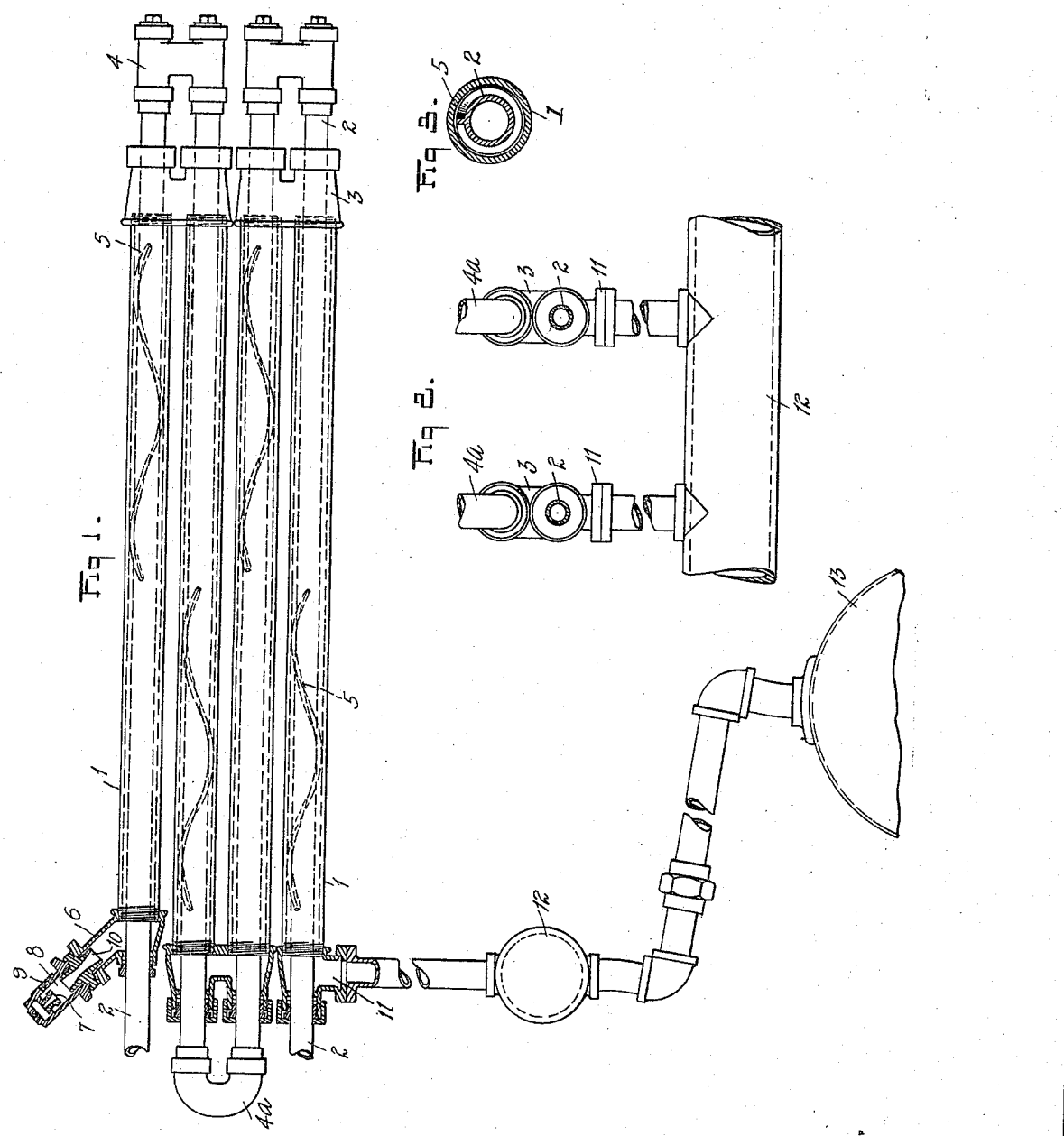

NICOLAI H. HILLER, OF CARBONDALE, PENNSYLVANIA.

ABSORBER.

1,186,576.  Specification of Letters Patent.  Patented June 13, 1916.

Application filed July 9, 1915. Serial No. 38,850.

*To all whom it may concern:*

Be it known that I, NICOLAI H. HILLER, a citizen of the United States of America, and a resident of Carbondale, county of Lackawanna, and State of Pennsylvania, have invented a certain new and useful Absorber, of which the following is a specification.

My invention relates to absorbers and comprises a conduit preferably consisting of substantially horizontal lengths of pipe connected to form a return-bend pipe coil, such pipe lengths provided with means for retarding flow of liquid through such substantially horizontal lengths, and for causing rotation of such liquid, and for maintaining a siphon-breaking space along the tops of such pipe lengths; the pipe coil being provided with means for carrying away the heat liberated as a result of the absorption.

Other features of my invention will be pointed out hereafter.

The objects of my invention are to avoid siphoning in pipe absorbers; to obtain a high efficiency of operation; to make the apparatus simple and compact; to maintain a pressure at the receiver only a very little less than that in the gas line; to avoid the trapping of air or other gas which does not absorb readily, in the coil.

In the accompanying drawings I illustrate one form of apparatus embodying my invention.

In said drawings: Figure 1 shows an elevation and partial vertical longitudinal section of an absorber embodying my invention; Fig. 2 shows a fragmentary end elevation and partial transverse section of a plurality of absorbing coils connected to a common discharge header; and Fig. 3 shows a transverse section of one of the double pipe runs of the absorber.

In the drawings, numerals 1 designate the outer pipes, and numerals 2 designate the inner pipes located within the outer pipes 1, but spaced well away from the walls thereof, and extending out through the ends of the pipe sections 1. The pipe sections 1 are connected in series by return-bend fittings 3, having at their ends stuffing boxes by means of which tight joints are formed around the pipes 2. The pipes 2 are connected in series by return-bend pipe fittings 4 located outside of the pipe fittings 3 of pipes 1. Certain at least of the inner pipes 2 are provided exteriorly with helical ribs 5, nearly but not completely filling the space between the outside of such pipes 2, and the corresponding pipes 1; and such helical ribs 5 may extend along such portion of the length of the corresponding pipes 2 as preferred; though preferably such ribs are located in the main, near the discharge ends of the corresponding pipes 1.

The pipes 2 are employed for the flow of cooling liquid. An injector 6 is provided for the admission of the absorbing liquid into the annular space between pipes 1 and 2, and for the admission of gas to such space and the mixing of the gas with the liquid; this injector, in the form shown, comprising a nozzle 7, through which the liquid is injected into combining space 8, such combining space having a gas inlet 9; and there being, beyond such combining space, a cone 10. At the lower end of the condenser there is a strong liquor outlet 11.

12 designates the discharge header, and 13 the receiver into which the absorber discharges.

In the operation of this absorber, weak liquor admitted through the nozzle 7, draws in gas through the inlet 9, the gas and weak liquor mingling in the condenser, and thence flowing into the annular space, between the inner wall of the first pipe 1 and the outer surface of the pipe 2 within that first pipe 1; the mixture flowing through such annular space to the opposite end of that first pipe 1, and thence down through the return-bend fitting to the annular space of the next pipe 1, and so on. The flow is retarded by the helical rib 5, nearly filling such annular space, thus insuring prolonged and intimate contact of the gas with the liquid—a condition favorable for absorption. The cooling of the mixture, by the water circulating through the inner pipes 2 is very efficient; and this also favors complete absorption.

I have found that the helical ribs 5 are very effective, not only in retarding the flow of the liquid down in the absorbing conduit, but also in preventing siphoning; for, since these ribs are spaced away from the inner walls of the outer pipes 1, a siphon-breaking space is maintained along the top of each such pipe section; *i. e.*, the liquid does not rise in each pipe section 1, clear to the top of that pipe section, but a gas space exists at the top, which effectually prevents the formation of a siphon-column. The said helical ribs also impart to the liquid passing through the annular space, a rotary motion, favorable to absorption, since it tends to insure thorough mixture of the liquid and gas, and further insuring complete submergence of the inner pipes 2 in the liquid; something which is of very great importance, since thereby all of the surface of the inner pipes 2 inclosed within the absorption conduit, is effective as cooling surface in direct contact with the liquid.

I have found that with this absorber a pressure at the receiver may be maintained which is very little if any less than that in the gas line leading to the injector; whereas in upflow absorbers there is frequently a drop of pressure of from four to five pounds; a drop which results in great loss, both in the capacity and in the efficiency of the apparatus, as the back pressure naturally governs the strength of the solution formed, which in turn has its effect in both capacity and economy of the apparatus. Another objection to the upflow absorber is that air or other gas which absorbs with difficulty, if at all, is apt to be trapped in the coil; whereas in the downflow type of absorber such air or gas works down through the coil into the receiver and is easily removed from that receiver.

I have found that with this downflow absorber a capacity of from forty to fifty per cent. greater than that obtainable from an upflow absorber of the same surface, may be obtained; also better economy. The absorber works best when a relatively high rate of flow of gas and absorbing liquid is maintained through it. As indicated particularly in Fig. 2, frequently a plurality of the absorbing coils will be connected in parallel to a common discharge header; and experience has shown that when too many such coils are connected in parallel to do the work required; i. e., when the capacity of the receiver is greater than is required for the work to be done, and therefore the rate of flow through the absorbing coils is lower than should be the case, the efficiency of the absorber is lower than if a less number of absorbing coils be used. I prefer that the flow of gas and absorbing liquid through such coils be at about the rate of forty feet per minute.

This absorber is particularly intended for use in absorption refrigeration machines of the ammonia type, but is also suitable for use wherever a gas is to be absorbed in liquid.

I am aware that heretofore heat exchangers have been proposed, wherein a helical rib is employed, within the conduit, for one purpose or another, but I am aware of no prior construction wherein there is a double-pipe conduit composed of substantially horizontal pipe sections, one above another, and connected in series and provided with a helical rib, between the inner and outer pipes, such rib spaced away at the top from the inner surface of the outer pipe, and so permitting the existence, along the top of the annular conduit, of a siphon-breaking gas space.

What I claim is:

1. An absorber comprising a closed conduit consisting of approximately horizontal pipe sections located at different levels and connected in series for the progressive downward flow of liquid through them, such conduit provided with means for maintaining a siphon-breaking gas space along the top of the conduit.

2. An absorber comprising approximately horizontal pipe sections, each consisting of inner and outer pipes forming an annular conduit, the pipe sections located at different levels, and the outer pipes connected in series for the progressive downward flow of liquid through them, the inner pipes arranged for the flow of cooling fluid through them, helical coils being provided in certain of such annular spaces and spaced away from the top of the annular conduit, such coils serving to retard the flow of liquid through such annular conduit, and to preserve a siphon-breaking space along the top of the conduit.

3. An absorber comprising a closed conduit consisting of approximately horizontal pipe sections located at different levels and connected in series for the progressive downward flow of liquid through them, such conduit comprising gas and liquid inlets near its upper end and an outlet near its lower end, and provided with means for retarding the flow of gas and liquid downward through it.

4. An absorber comprising a closed conduit consisting of approximately horizontal pipe sections located at different levels and connected in series for the progressive downward flow of liquid through them, such conduit comprising gas and liquid inlets near its upper end and an outlet near its lower end, and provided with means for retarding the flow of gas and liquid downward through it, and for maintaining a siphon-breaking space along the top of the conduit.

In testimony whereof I have signed this specification in the presence of two subscribing witnesses.

NICOLAI H. HILLER.

Witnesses:
H. M. MARBLE,
PAUL H. FRANKE.